No. 671,279. Patented Apr. 2, 1901.
C. S. JAMESON.
MEASURING INSTRUMENT.
(Application filed Dec. 23, 1898.)
(No Model.)
2 Sheets—Sheet 2.
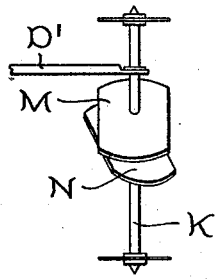
Fig. 5.
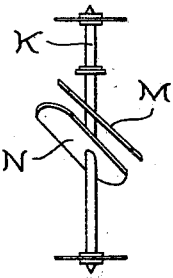
Fig. 6.
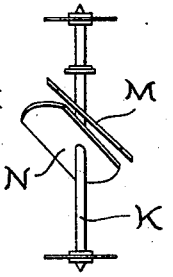
Fig. 7.
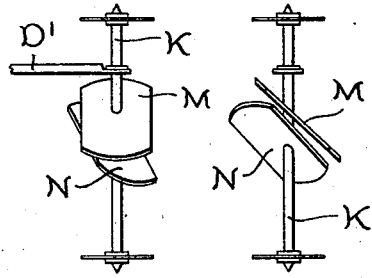
Fig. 8.
Fig. 9.
Test No. 1.    Test No. 2
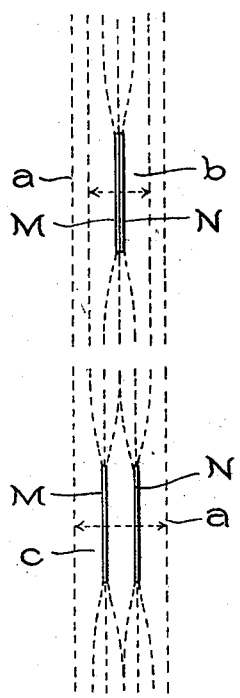
Fig. 10.
Witnesses.
A. H. Abell.
A. F. Macdonald.
Inventor.
Charles S. Jameson.
by Albert G. Davis
Atty.

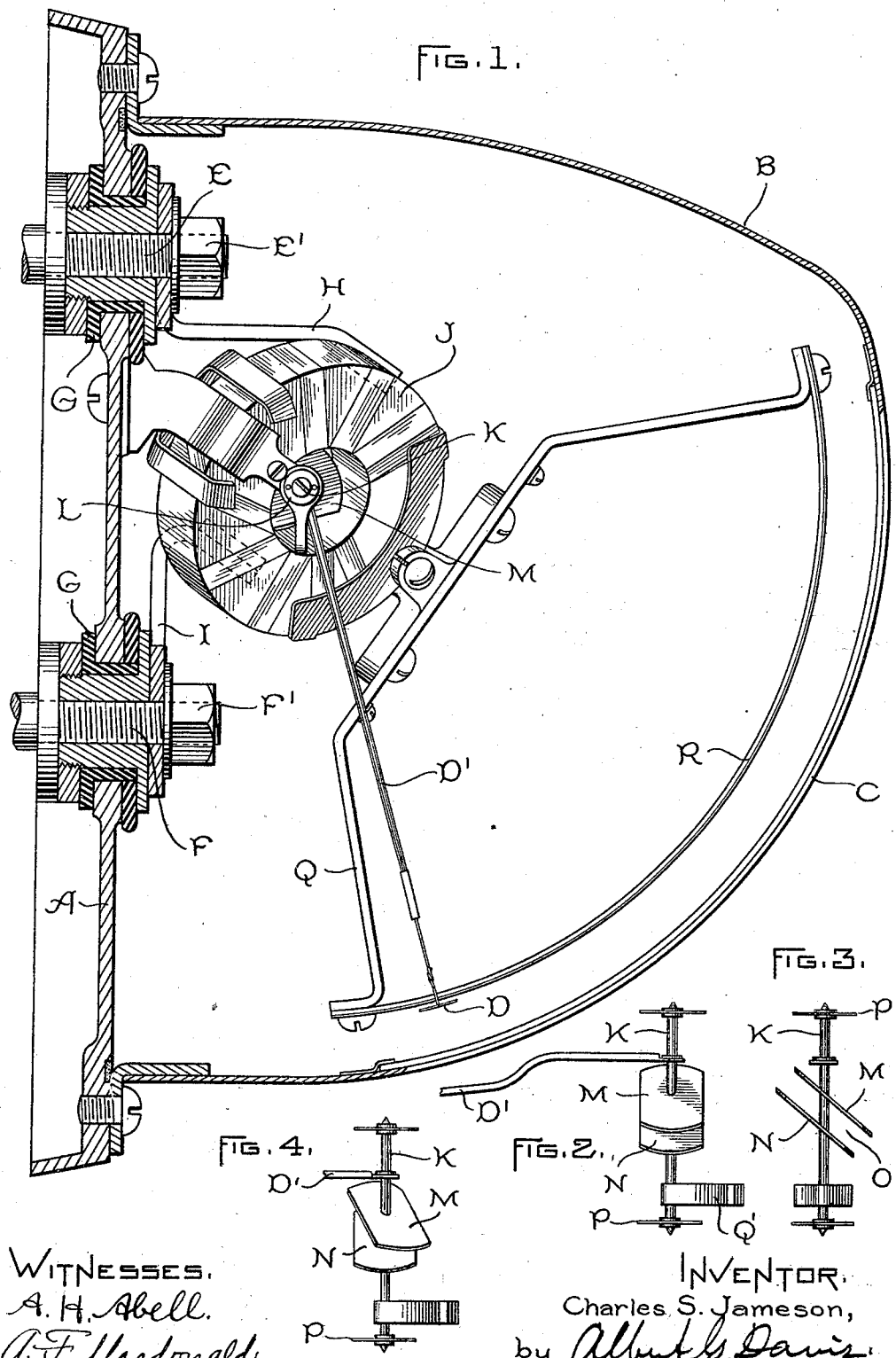

UNITED STATES PATENT OFFICE.

CHARLES S. JAMESON, OF SWAMPSCOTT, MASSACHUSETTS, ASSIGNOR TO THE GENERAL ELECTRIC COMPANY, OF NEW YORK.

MEASURING INSTRUMENT.

SPECIFICATION forming part of Letters Patent No. 671,279, dated April 2, 1901.

Application filed December 23, 1898. Serial No. 700,121. (No model.)

*To all whom it may concern:*

Be it known that I, CHARLES S. JAMESON, a citizen of the United States, residing at Swampscott, in the county of Essex and State of Massachusetts, have invented certain new and useful Improvements in Measuring Instruments, (Case No. 701,) of which the following is a specification.

My invention relates to that class of electric measuring instruments in which an armature of iron or other magnetic material is disposed within the influence of a magnetic field in such a manner that changes in the strength of the field cause a movement or a deflection of the armature and of the pointer moved thereby.

My invention has for one of its objects the increasing of the torque of an instrument of the class above described, and for a further object the changing of the character of the scale by increasing or decreasing the amount of the deflections for a given unit at different parts of the scale, whereby a nearly uniform scale may be obtained, if desired, or a scale in which the indications representing units of any desired standard are more widely spaced at one portion of the scale than another.

In the accompanying drawings, which illustrate an embodiment of my invention, Figure 1 is a vertical section of a measuring instrument with the operative parts in elevation. Fig. 2 is a front elevation of the armature of the instrument. Fig. 3 is a side elevation of the same. Fig. 4 is a front elevation of the armature, showing the pieces of magnetic material of which it is composed so arranged that the upper piece enters the magnetic field behind the lower piece in order to change the normal character of the scale. Fig. 5 is a front view of the armature, showing the lower disk arranged to enter the magnetic field behind the upper disk. Fig. 6 is a side view of the same. Figs. 7 and 8 are respectively a front and side elevation of the armature, showing the disks lying in planes making an angle with each other, the planes also making an angle with the plane of the shaft. Fig. 9 shows the development of two scales side by side, and Fig. 10 is an illustrative diagram.

In the United States Patent to Elihu Thomson, No. 542,663, dated July 16, 1895, is shown an electric measuring instrument in which the field-coil is placed at an angle to the shaft of the instrument, and mounted on the shaft and at an angle thereto is an armature of magnetic material. In this patent the armature is shown as being composed of a number of thin plates of magnetic material mounted on the shaft, which plates are in contact with each other. I have discovered in connection with instruments of this class, as well as with other measuring instruments, that if the pieces of iron or other magnetic material of which the armature is composed are separated by a space more or less great instead of being in contact with each other the torque of the instrument can be practically doubled. I have further discovered that by arranging the said pieces of magnetic material upon the shaft in planes lying at an angle to each other instead of placing them in parallel planes or placing them so that one or more of the disks enters the magnetic field after the other or others the character of the scale can be changed— that is to say, the scale of the instrument may be so arranged that the indications representing certain definite units may be practically uniform over the entire range, or the indications may be more widely spaced at one portion of the scale than another. This is a particularly desirable feature, since it permits me to arrange the scale in such a manner that the readings for which the instrument is especially intended can be made at that point on the scale having widely-spaced indications.

For the purpose of illustration I have shown my invention in connection with an inclined-coil instrument, since it has great utility in instruments of that class; but my invention is not limited to this, since it can be applied to other types of instrument having iron armatures working in magnetic fields, and I aim to embrace such a use in the claims.

In the drawings, A represents the cast-metal back of a measuring instrument of the edgewise type, and mounted on the back and arranged to protect the working parts of the instrument is a cover B. The cover is secured to the back by means of screws and is provided on the curved front with a glass-covered opening C, permitting the movements of the needle D to be observed.

Mounted in the back are two terminals E and F, which are insulated therefrom by insulating-bushings G. Secured in place by the terminal-nuts E' and F' are outwardly-extending supports H and I, which support the field-coil J. In addition to supporting the coil these supports convey current to and from the coil. The field-coil J is wound in the form of a cylinder and is supported in such a manner that the plane of the coil makes an angle with the plane of the back and also with that of the armature-shaft K. Secured to the field-coil J or its support by a frame Q is a curved scale-plate R, over which the needle or pointer D travels. The armature-shaft is supported by a bearing L on the front end and by a similar bearing on the rear end, which is placed directly behind the front bearing.

The torque of instruments having an iron armature and exciting-coil movable with respect to each other depends on the number of lines which pass through the armature. Therefore to increase the torque of the instrument the number of lines of force acting on the armature is increased by increasing the effective area of the iron exposed to the flux. Since the number of lines of force are inversely proportional to the reluctance of the magnetic circuit, and in these instruments by far the larger part of the reluctance in the air part of the circuit is in the immediate vicinity of the armature, any increase in the exposed area of the iron will correspondingly increase the area of the air-path of the lines at that point, thus decreasing the reluctance and increasing by a very large amount the number of lines of force which pass through the iron. In other words, the moving element being made of magnetic disks, the ends of which are separated or so disposed as to present a plurality of separated points or surfaces, tends to drag in a greater number of lines of force than would be the case where it is composed of disks in contact throughout their length, as is the case with previous structures. Suppose, for example, two similar iron disks are held together and form practically one piece. The mass is now double that of a single disk, but the increase in the surface exposed to the lines of force has been slight. If now the disks are separated slightly, the two outside surfaces are active as before, and in addition there are two active inside surfaces, the actual reluctance of the iron being immaterial. As an illustration of the application of this theory attention is called to Fig. 10. The lines of force $a$ extend in substantially parallel planes, and in the upper portion of the figure the disks or plates M and N are placed together, as is common in certain types of instruments, while in the lower part of the figure the disks are separated in accordance with my invention. The lines of force which thread through the upper armature are practically all within the space $b$, while the lines of force for the second armature extend through practically twice the amount of space, as indicated by $c$. By separating the disks I obtain an effect corresponding to that of an armature having a much greater mass of iron, and at the same time I avoid the increased weight and also the momentum of heavy moving parts, which in measuring instruments are most important considerations.

Mounted on the shaft and at an angle thereto which is other than a right angle is an armature of magnetic material, consisting in the present instance of two flat metal disks or plates M and N, which are slightly rounded on the upper and lower edges, as indicated in Fig. 2, and are separated by an air-space O. Spiral springs P are located at the top and bottom of the shaft and serve to return the moving system to zero when the flow of current ceases in the field-coil. The torque of the instrument having been practically doubled by reason of the arrangement of the disks M and N, the springs P have been strengthened accordingly, so that the range of movement of the needle remains practically as before. This increase in torque is highly desirable, since it renders the friction of the moving parts practically negligible. To compensate for the weight of the arm D' and pointer or needle D, a counterweight Q' is mounted on the shaft at any suitable point. With the plates parallel, as in Figs. 2 and 3, the scale is open in the center and closed on the ends, as shown by the scale of test No. 1 in Fig. 9.

In Fig. 4 I have shown the iron disks M and N forming the armature occupying parallel planes, as before, but the upper disk M is arranged to enter the field behind the lower disk N. By changing the angular relation which these disks bear to each other the character of the scale of the instrument may be varied in any desirable manner. In other words, by making one disk enter the magnetic field behind the other the deflections per unit of measurement are greater at the outer or extreme end of the scale, as shown in the right-hand scale in Fig. 9. This is particularly useful where the readings of the instrument are to be made at or about the end of the scale.

In Fig. 5 the disk M occupies the same angular position with respect to the shaft that it did in Figs. 2 and 3, while the angular position of the disk N with respect to the disk M has been changed by rotating it slightly on the shaft K. If desired, both of the plates may be mounted on the shaft at different angular positions from those which they occupy in these figures.

In Figs. 7 and 8 I have shown the lower disk N arranged to enter the magnetic field of the instrument at about twenty-eight degrees behind the upper disk M. In addition to this the lower disk is tilted slightly with respect to the upper disk, so that they no longer occupy parallel planes, but planes making an angle with each other. With the disks arranged as described the scale is substantially the same as that shown in test No. 1 of Fig. 9, except that it is more open in the middle. I have found that by changing the plane of the iron disks with respect to the plane of the shaft, by tilting one disk with respect to the other, and by arranging one disk to enter the field after the other practically any desired character of scale may be obtained. I have shown the disks in a position to give the maximum torque, which is substantially twice the same as that of the ordinary inclined-coil type of instrument, but by placing the irons nearer together or placing one of the disks so that it in a measure opposes the action of the other disk I can change the torque at will.

In Fig. 9 I have reproduced two scales made from a single instrument, but with different armatures. The scale on the left-hand side of the central line, which is marked "Test No. 1," represents the indications taken from an instrument of the class described, in which the disks are arranged as shown in Figs. 2 and 3. Test No. 2 represents a scale taken from the same instrument, but with an armature constructed in accordance with Fig. 4 or Fig. 5 of the drawings. It will be noted that the scale of test No. 2 is closed more at the beginning than that of test No. 1; but, on the other hand, the last end is much more open than that of test No. 1, the intermediate indications being substantially the same. An instrument constructed so as to have a scale similar to the one shown in test No. 1 is particularly useful where the indications of the needle are to be read at the first end or the middle of the scale, while an instrument constructed so as to have a scale similar to test No. 2 is most useful where the readings are normally to be made at the middle or higher portions of the scale. It is evident, however, that the scale of test No. 2 is better adapted for general use than that of test No. 1.

In my statement of invention I have outlined what I now believe to be the mode of operation of the improved construction described and claimed. I do not wish, however, to imply that the theoretical statements herein made are to be construed as limitations, as the improved result attained is a consequence of my improved structure, independent of any theoretical considerations as to its mode of operation.

What I claim as new, and desire to secure by Letters Patent of the United States, is—

1. In an electric measuring instrument, the combination of means for creating a magnetic field, an indicating device, and an armature for moving the indicator, comprising disks which are located in the magnetic field in a manner to be moved thereby, and are separated from each other by a space.

2. In an electric measuring instrument, the combination of a field-magnet coil the strength of which varies with changes in the circuit relations, an indicator, an armature for moving the indicator, comprising at least two disks made of magnetic material and separated from each other by a space.

3. In an electric measuring instrument, the combination of a field-magnet coil, an indicator, a shaft, and an armature mounted thereon, comprising disks of soft iron which are separated from each other by an air-space and occupy separate planes, which planes form angles with the plane of movement of the armature.

4. As an article of manufacture, an armature for a measuring instrument, comprising a shaft, and a pair of disks which are mounted on the shaft at an angle to its plane of movement, and are separated from each other by a space.

5. As an article of manufacture, an armature for a measuring instrument, comprising a shaft, and a pair of straight-sided disks having rounded ends mounted thereon and separated by a space which is greater than the thickness of one of the disks.

6. In an electric measuring instrument, the combination of a field-magnet, an armature-shaft, an armature comprising disks which are separated from each other by a space, the disks being mounted on the shaft at an angle to its plane of movement, and occupying planes which are other than parallel to each other.

7. As an article of manufacture, an armature for an electric measuring instrument, comprising a shaft and a pair of disks made of magnetic material, which are mounted on the shaft in such a manner that they approach one another more on one side of the center of the shaft than on the other.

8. As an article of manufacture, an armature for an electric measuring instrument, comprising a shaft and at least two iron disks which are separated from each other by a space, and are mounted on the shaft in such a manner that they will when mounted in place in an instrument, enter the magnetic field in succession.

9. In an electric measuring instrument, the combination of an armature-shaft, an armature comprising disks of magnetic material mounted on the shaft at an angle to its plane of movement, and separated from each other by an air-space, a field-coil, and a support for maintaining the plane of the field-coil at an angle to the plane of movement of the armature-shaft.

10. The combination of a field-magnet with an armature mounted for movement within the field of the magnet, which consists of a plurality of iron disks mounted on the shaft in such a manner that one disk moves from a weak to a strong field behind another disk through a varying angle relatively to the axis of the coil.

11. An electric measuring instrument, comprising a coil, a plurality of metal plates mounted on an axis in the field of the coil at points of different magnetic intensity, said plates being inclined in position to turn through a varying angle relatively to the coil-axis.

12. An electric measuring instrument, comprising a coil, a plurality of plates of magnetizable material mounted on an axis in the field of the coil at points of different magnetic intensity, said plates being inclined in position to turn through a varying angle relatively to the coil-axis.

13. An electric measuring instrument, comprising a coil and plates of magnetic material which are separated in a manner to present independent paths to the field flux, and are mounted to shift by rotary movement from a position at an angle to a position of closer parallelism to the field of force of the coil.

14. In a measuring instrument, the combination of a field-magnet, a moving element located within the influence of the magnet and composed of metal plates which are separated from each other in a manner to gather in a greater number of lines of force than would be the case if the disks were placed in contact throughout their length.

15. In a measuring instrument, the combination of a field-magnet with an armature located within the influence of the field-magnet, comprising magnetic material presenting a plurality of separated surfaces to the field flux, whereby the torque of the instrument is increased.

In witness whereof I have hereunto set my hand this 17th day of December, 1898.

CHARLES S. JAMESON.

Witnesses:
DUGALD McKILLOP,
JOHN McMANUS.